(12) United States Patent
Artsiely (10) Patent No.: US 7,210,319 B2
(45) Date of Patent: May 1, 2007

(54) MULTIFUNCTIONAL VEHICLE LOCK

(75) Inventor: Eyal Artsiely, Bikat Yericho (IL)

(73) Assignee: Rav Bariach Vehicle Protection Ltd., Mul-T-Lock Park, Yavne (IL)

( * ) Notice: Subject to any disclaimer, the term of this patent is extended or adjusted under 35 U.S.C. 154(b) by 82 days.

(21) Appl. No.: 10/727,488

(22) Filed: Dec. 5, 2003

(65) Prior Publication Data

US 2004/0237611 A1    Dec. 2, 2004

(30) Foreign Application Priority Data

May 27, 2003    (IL)    .................................... 156153

(51) Int. Cl.
*E05B 63/14*        (2006.01)
(52) U.S. Cl. ........................ 70/120; 70/258; 70/379 R; 70/380; 292/4; 292/34
(58) Field of Classification Search ................ 70/120, 70/238, 239, 258, 379 R, 379 A, 380; 292/4–7, 292/34, DIG. 29, DIG. 43
See application file for complete search history.

(56) References Cited

U.S. PATENT DOCUMENTS

| | | | | |
|---|---|---|---|---|
| 421,205 A | * | 2/1890 | Sykora ........................ 70/373 |
| 446,789 A | * | 2/1891 | Reed ............................ 70/120 |
| 578,763 A | * | 3/1897 | Nash ........................ 70/379 R |
| 900,627 A | * | 10/1908 | Waugh et al. ............... 703/358 |
| 2,055,289 A | * | 9/1936 | Hanan ......................... 70/240 |
| 2,885,931 A | * | 5/1959 | McDonald et al. ........... 70/167 |
| 3,991,595 A | * | 11/1976 | Bahry et al. .................. 70/120 |
| 4,073,170 A | * | 2/1978 | Miyabayashi et al. ........ 70/256 |
| 4,189,174 A | * | 2/1980 | Van Parys .................... 292/98 |
| 4,237,709 A | * | 12/1980 | Krugener et al. ............. 70/107 |
| 4,556,244 A | * | 12/1985 | Bisbing ....................... 292/65 |
| 4,962,652 A | * | 10/1990 | Schneider ...................... 70/89 |
| 5,076,080 A | * | 12/1991 | Fuss et al. .................... 70/125 |
| 5,350,213 A | * | 9/1994 | Bernardo ...................... 296/98 |
| 5,857,364 A | * | 1/1999 | Hsu et al. ..................... 70/120 |
| 6,030,019 A | * | 2/2000 | Stiltner et al. ............. 296/57.1 |
| 6,116,660 A | * | 9/2000 | Langkamp et al. ........... 292/65 |

FOREIGN PATENT DOCUMENTS

NO    49312    *    9/1931

* cited by examiner

*Primary Examiner*—Lloyd A. Gall
(74) *Attorney, Agent, or Firm*—Dekel Patent Ltd.; David Klein (57) ABSTRACT

A multifunctional vehicle lock including a cylinder lock comprising a rotatable tumbler, a coupling member rotationally linked to the tumbler, wherein rotation of the tumbler rotates the coupling member, a first vehicle locking element connected to the coupling member, and a second vehicle locking element connected to the coupling member, wherein rotation of the coupling member moves the first vehicle locking element in a translatory movement along a first axis and simultaneously moves the second vehicle locking element in a translatory movement along a second axis angled at a non-zero angle with respect to the first axis.

4 Claims, 12 Drawing Sheets

MULTIFUNCTIONAL VEHICLE LOCK

FIELD OF THE INVENTION

The present invention relates generally to vehicle locks and particularly to a lock that simultaneously locks at least two movable elements of a vehicle.

BACKGROUND OF THE INVENTION

Many kinds of security locks are known for locking vehicle doors and systems. For example, devices are known that lock the engine hood, or which lock access to the trunk. Other devices lock the gearshift lever, the steering wheel or hand brakes, for example.

Czech published patent document CZ 289123 describes a locking system for simultaneous blocking two or more movable elements of a motor vehicle. The locking system may be key operated or non-key operated. The locking system includes at least two blocking pins arranged to simultaneously block two movable elements of a vehicle, for example, a gearshift lever and a hand brake. A locking mechanism is provided that includes a main body and a rotary system. A plurality of connecting elements link the blocking pins to the rotary system. The rotary system includes a rotary pulley having at least two recesses, to which the connecting elements are attached. Rotation of the rotary pulley simultaneously actuates the blocking pins to block or unblock the vehicle movable elements. Rotation of the rotary pulley either pulls the connecting elements to the blocking pins or pushes the connecting elements to the blocking pins; there is no combination of pushing and pulling.

SUMMARY OF THE INVENTION

The present invention seeks to provide an improved and novel multifunctional vehicle lock that simultaneously locks at least two movable elements of a vehicle, as is described more in detail hereinbelow.

There is thus provided in accordance with an embodiment of the present invention a multifunctional vehicle lock comprising a cylinder lock comprising a rotatable tumbler, a coupling member rotationally linked to the tumbler, wherein rotation of the tumbler rotates the coupling member, a first vehicle locking element connected to the coupling member, and a second vehicle locking element connected to the coupling member, wherein rotation of the coupling member moves the first vehicle locking element in a translatory movement along a first axis and simultaneously moves the second vehicle locking element in a translatory movement along a second axis angled at a non-zero angle with respect to the first axis.

In accordance with an embodiment of the present invention the coupling member comprises a worm drive connected to the first vehicle locking element.

Further in accordance with an embodiment of the present invention the first vehicle locking element is connected to the coupling member by a pin that fits in a helical groove formed in the worm drive, wherein as the coupling member rotates, the pin translates along the first axis guided by the helical groove.

Still further in accordance with an embodiment of the present invention the helical groove has a terminal arcuate portion in which the pin is geometrically lockable with respect to the coupling member.

In accordance with an embodiment of the present invention the second vehicle locking element is connected to the coupling member by means of a wrist pin and connecting element connection.

Further in accordance with an embodiment of the present invention the tumbler of the cylinder lock comprises a set of tumbler pins that are movable to a shear line against a set of housing pins disposed in a first pin housing.

Still further in accordance with an embodiment of the present invention a second pin housing may be provided wherein the tumbler pins are movable to a shear line against a set of housing pins disposed in the second pin housing.

In accordance with an embodiment of the present invention the first and second lock elements are arranged to move in and out of a protective casing.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Reference is now made to FIGS. 1-4, which illustrate a multifunctional vehicle lock 10, constructed and operative in accordance with an embodiment of the present invention.

Figure 1:
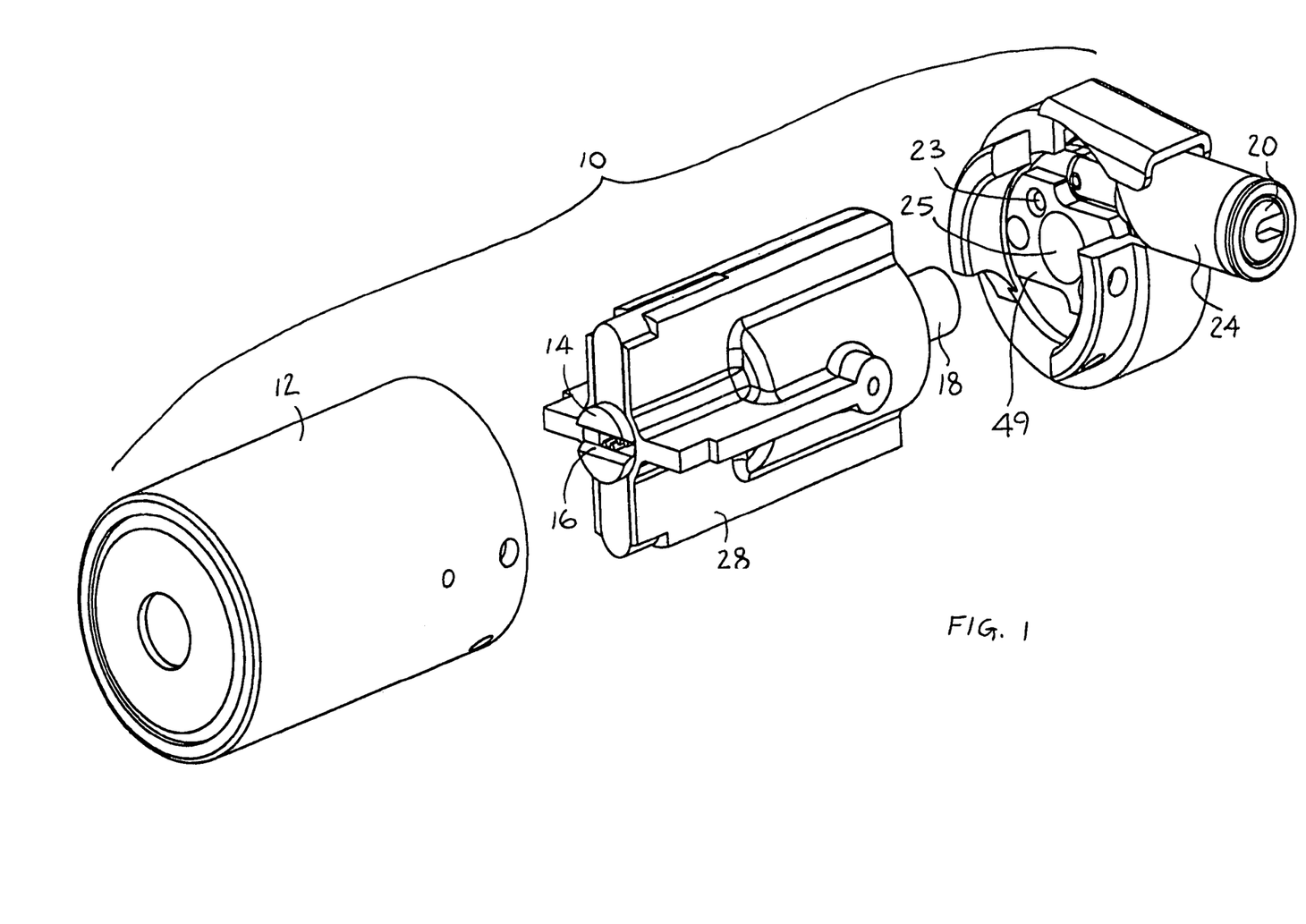
FIGS. 1 and 2 are simplified front exploded and rear perspective illustrations, respectively, of a multifunctional vehicle lock, constructed and operative in accordance with an embodiment of the present invention, in a retracted orientation.
Figure 2:
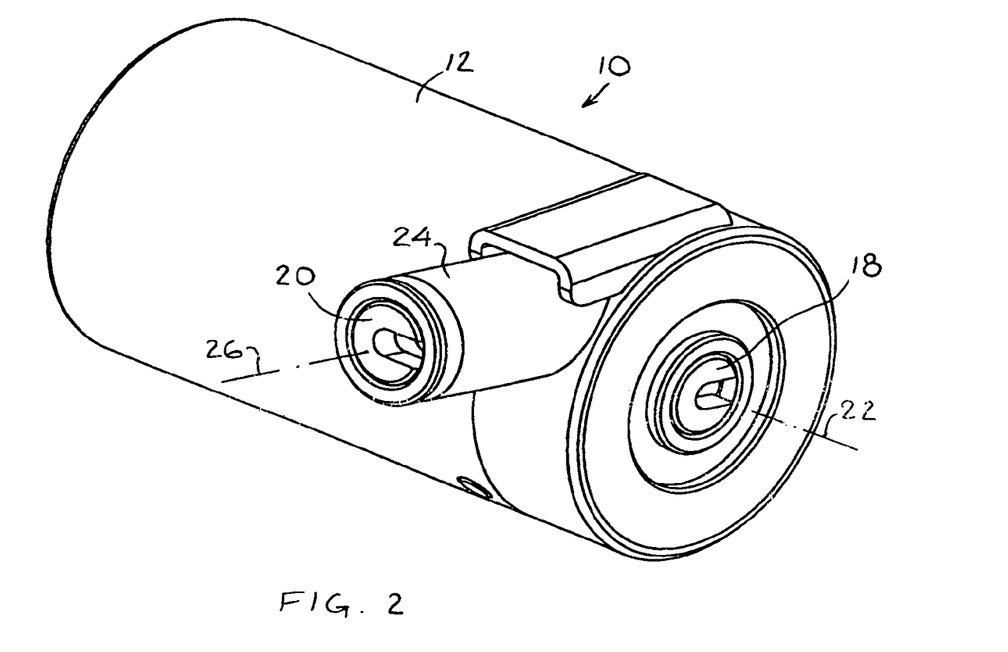

Lock 10 may comprise an outer protective casing 12 in which a cylinder lock 14 is disposed. Cylinder lock 14 has a keyway 16 in which a key (not shown) may be inserted to turn lock 14 and actuate a first vehicle locking element 18 and a second vehicle locking element 20, as is described more in detail hereinbelow. (First and second vehicle locking elements 18 and 20 are also simply referred to herein as first and second locking elements 18 and 20.) First locking element 18, operatively connected to lock actuator 14, may be selectively moved in and out of outer casing 12 in a translatory movement along a first axis 22. Second locking element 20 may be selectively moved in and out of a side protective casing 24, secured to outer casing 12, in a translatory movement along a second axis 26 angled at a non-zero angle (e.g., 90°) with respect to first axis 22. The protective casings 12 and 24 may be made of any suitable material, such as but not limited to, a hardened steel alloy.

It is noted that the invention is not limited to a key-actuated lock. Rather the invention encompasses any kind of actuable lock, such as but not limited to, a motor-driven tumbler (e.g., with an electric, hydraulic, or pneumatic motor and the like) or a turn-knob instead of a key.

As seen in FIG. 1, an inner protective casing 28 may also be provided, and first locking element 18 may be selectively moved in and out thereof. It is appreciated that this is just one example of a suitable construction for the elements of lock 10, and the present invention is not limited to the illustrated embodiment.

Figure 3:
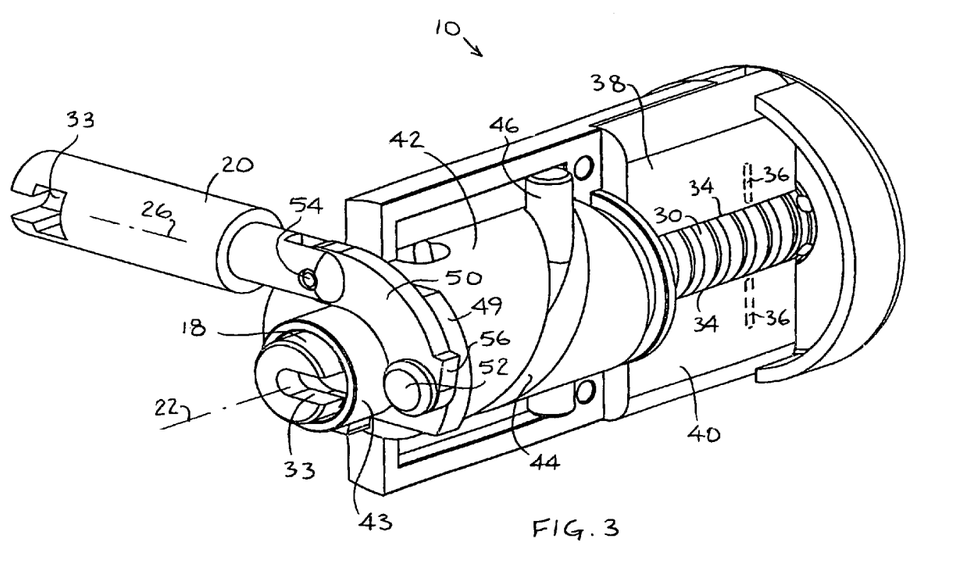
FIG. 3 is a simplified cutaway pictorial illustration of the multifunctional vehicle lock of FIG. 1, showing inner elements of the lock constructed and operative in accordance with an embodiment of the present invention, in a retracted orientation.
Figure 4:
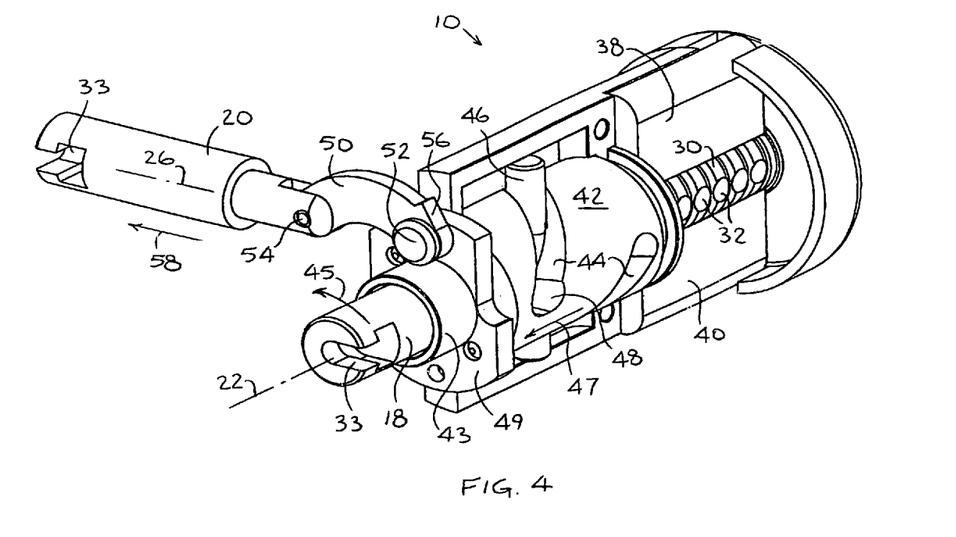
FIG. 4 is a simplified cutaway pictorial illustration of the multifunctional vehicle lock of FIG. 1, halfway between retracted and extended orientations.
Figure 5:
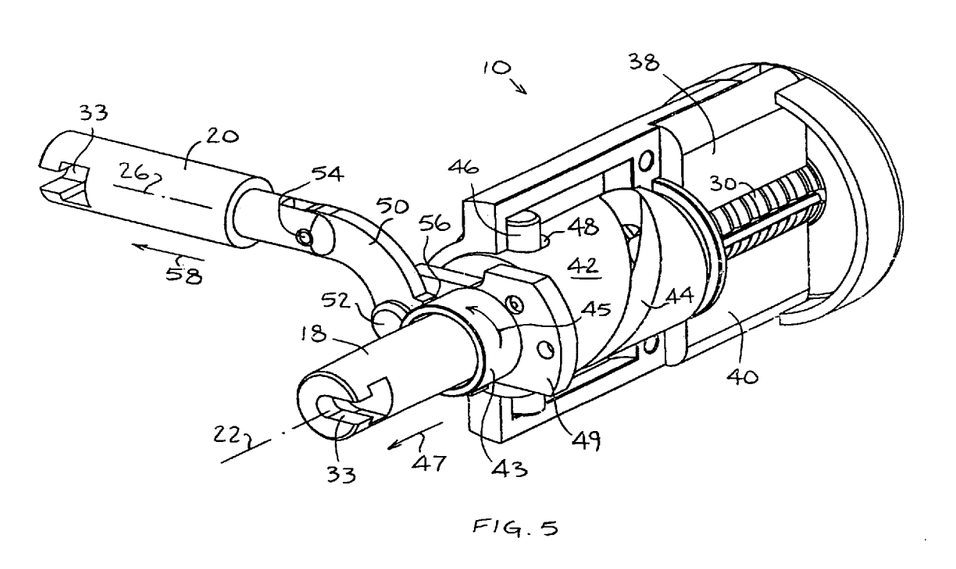
FIG. 5 is a simplified cutaway pictorial illustration of the multifunctional vehicle lock of FIG. 1, in an extended orientation.

Reference is now made to FIGS. 3–5, which illustrate inner elements of lock 10 and their operation, in accordance with an embodiment of the present invention.

Cylinder lock 14 may comprise a rotatable tumbler 30. Tumbler 30 may comprise a set of tumbler pins 32 (seen in FIG. 4) that are movable to a shear line 34 against a set of housing pins 36 (shown simplistically in broken lines in FIG. 3) disposed in a first pin housing 38 and a second pin housing 40. The presence of two pin housings 38 and 40 permits removing the key (not shown) from cylinder lock 14 at more than one angular position. The pin housings 38 and 40 may be arranged at any angular orientation with respect to one another. In the illustrated embodiment, pin housings 38 and 40 are arranged at 180° from each other, but it is appreciated that the invention is not limited to this arrangement.

A coupling member 42 may be rotationally linked to tumbler 30, wherein rotation of tumbler 30 rotates coupling member 42. Both first and second locking elements 18 and 20 may be connected to coupling member 42, wherein rotation of coupling member 42 moves first locking element 18 in a translatory movement along first axis 22 and simultaneously moves second locking element 20 in a translatory movement along second axis 26, as is now described.

Coupling member 42 may comprise a worm drive that includes one or more helical grooves 44. First locking element 18 may be coupled to coupling member 42 by a pin 46 that fits in helical groove 44, wherein as coupling member 42 rotates, pin 46 translates along first axis 22 guided by helical groove 44. In FIG. 3, pin 46 is at one end (the right end in the sense of FIG. 3) of coupling member 42. As coupling member 42 rotates in the direction of an arrow 45, pin 46 advances along first axis 22 as indicated by arrow 47 in FIG. 4. First locking element 18 also advances along first axis 22 together with pin 46, until pin 46 and first locking element 18 reach an extended position shown in FIG. 5. First locking element 18 may pass through a collar 43. Helical groove 44 may have a terminal arcuate portion 48 in which pin 46 may be geometrically locked with respect to coupling member 42 in the extended position, as seen in FIG. 5. Alternatively or additionally, pin 46 may be geometrically locked with respect to coupling member 42 at the retracted position or any position therebetween.

Coupling member 42 may have a terminal member 49 secured thereto, to which second locking element 20 may be connected by means of a connecting element 50 pivotally connected to terminal member 49 by means of a wrist pin 52. Terminal member 49 may be secured to coupling member 42 by any suitable means, such as but not limited to, a pinned connection wherein pins (not shown) from inner protective casing 28 mate with holes 23 in terminal member 49 (see FIG. 1). Terminal member 49 may be formed with a central aperture 25 (FIG. 1) for first locking element 18 to pass therethrough. Connecting element 50 may be also pivotally connected to second locking element 20 by means of another wrist pin 54.

As coupling member 42 rotates in the direction of arrow 45 (FIG. 4), connecting element 50 pushes second locking element 20 in the direction of an arrow 58 out through casing 24 (shown in FIGS. 1 and 2). Further rotation of coupling member 42 in the direction of arrow 45 pushes second locking element 20 further out through casing 24 in the direction of arrow 58 to the extended position seen in FIG. 5. Second locking element 20 is geometrically locked in the extended position of FIG. 5 because of the rotational position of connecting element 50 and second locking element 20. Any force along axis 26 in the direction towards collar 43 cannot turn terminal member 49 in the direction opposite to arrow 45. It is noted that connecting element 50 may include an abutting surface 56, which in the extended position of FIG. 5, is also brought into geometrically locked engagement with collar 43.

Figure 6:
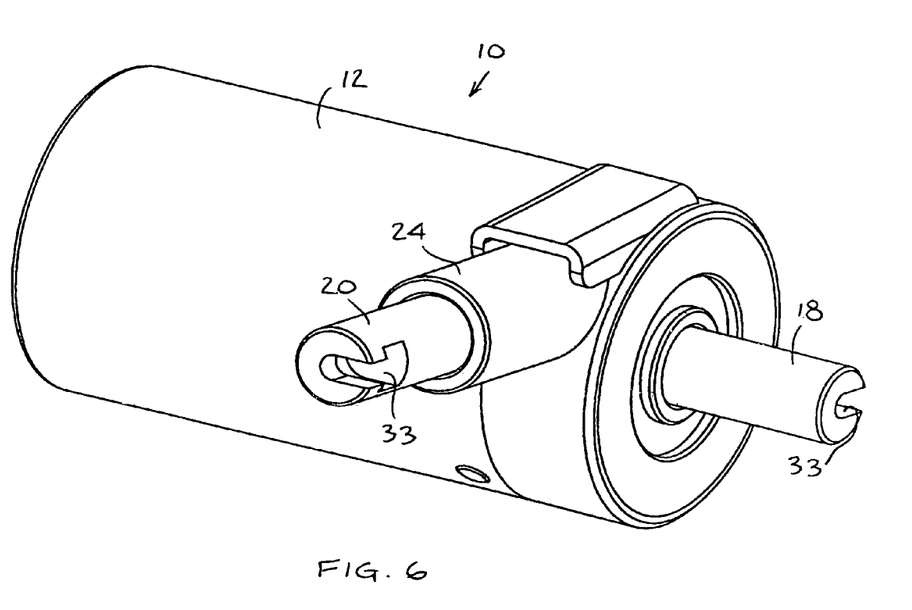
FIG. 6 is a simplified rear perspective illustration of the multifunctional vehicle lock of FIG. 1, in an extended orientation.

FIG. 6 illustrates (in a rear perspective view) the multifunctional vehicle lock 10 in an extended orientation, corresponding to the orientation of FIG. 5.

It is appreciated that first and second locking elements 18 and 20 may be brought back to the retracted position by the opposite rotation of tumbler 30.

Figure 7:
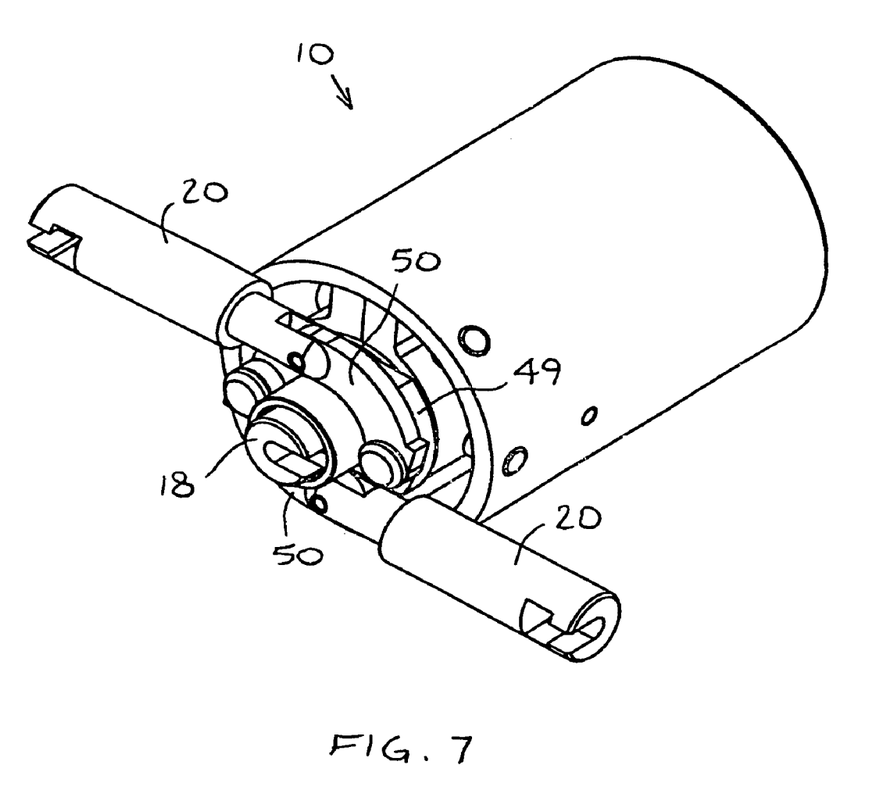
FIGS. 7 and 8 are simplified rear perspective illustrations of the multifunctional vehicle lock of FIG. 1, with a plurality of side-extending locking elements in respective retracted and extended orientations.
Figure 8:
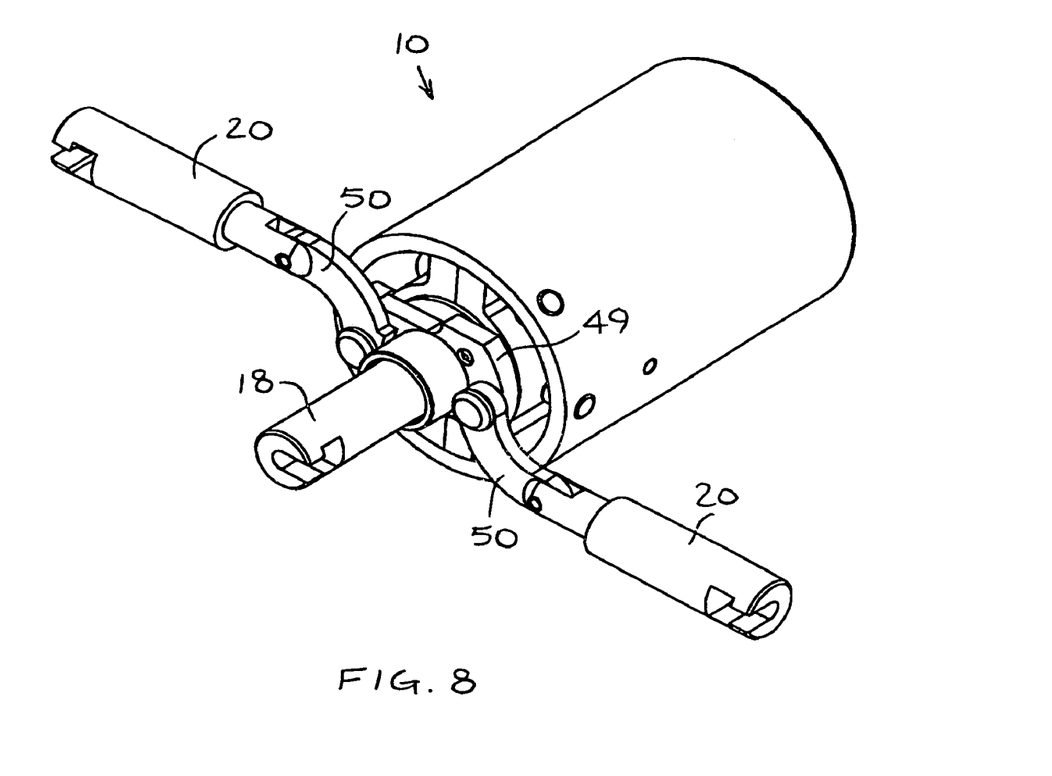

The invention is not limited to a single side-extending second locking element 20. FIGS. 7 and 8 illustrate multifunctional vehicle lock 10 with a plurality of side-extending locking elements 20 in respective retracted and extended orientations. Any number of locking elements may be provided with lock 10. The connecting elements 50 that pivotally connect second locking elements 20 to terminal member 49 may have different or equal lengths and may be connected at different or equal radii with respect to the center of rotation of coupling member 42 (or terminal member 49), such that second locking elements 20 are extendable to different or equal lengths.

First and second locking elements 18 and 20 may comprise attachment members 33, such as but not limited to, attachment grooves formed at ends thereof. Attachment members 33 may be used to attach locking attachments to first and second locking elements 18 and 20, non-limiting examples of which are now described.

Figure 9:
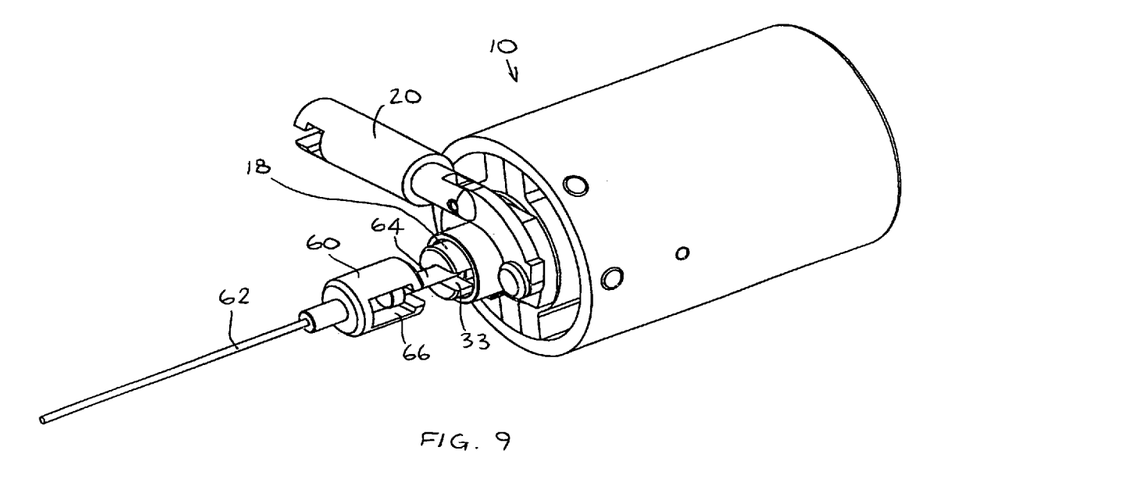
FIG. 9 is a simplified rear perspective illustration of the multifunctional vehicle lock of FIG. 1, with a locking attachment assembled on a first locking element of the multifunctional vehicle lock.
Figure 10:
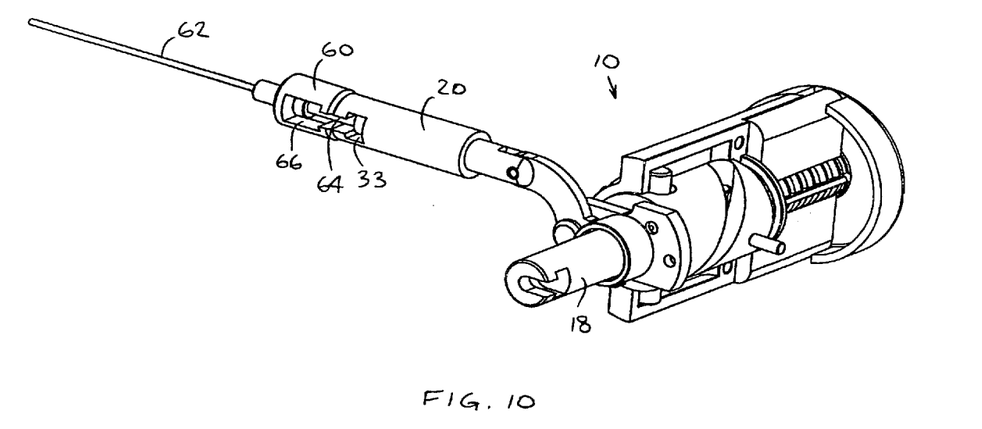
FIG. 10 is a simplified rear perspective illustration of the multifunctional vehicle lock of FIG. 1, with a locking attachment assembled on a second locking element of the multifunctional vehicle lock.

Reference is now made to FIG. 9, which illustrates a locking attachment 60 assembled on first locking element 18. Locking attachment 60 may comprise an elongate wire 62 useful for locking vehicle hoods, trunks, gas caps and other vehicle accessories. Locking attachment 60 may be connected to attachment member 33 by means of an adapter 64 that fits into attachment member 33 and into a groove 66 formed in locking attachment 60. FIG. 10 illustrates locking attachment 60 alternatively assembled on second locking element 20. FIG. 10 shows that adapter 64 may be provided in any length, size or shape.

Figure 11:
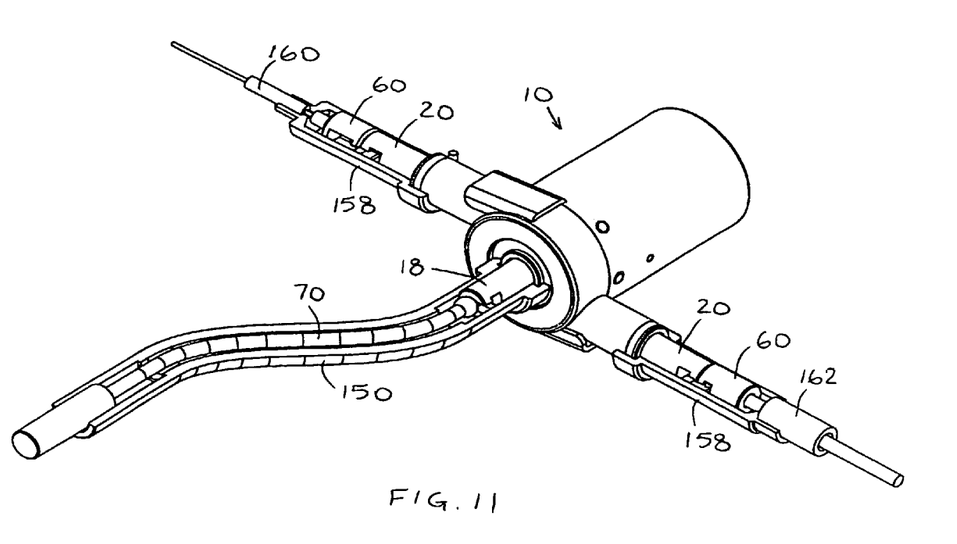
FIG. 11 is a simplified rear perspective illustration of the multifunctional vehicle lock of FIG. 1, with a plurality of locking attachments assembled on a pair of side-extending locking elements and a flexible locking attachment assembled on a linear extending locking element of the multifunctional vehicle lock.
Figure 12:
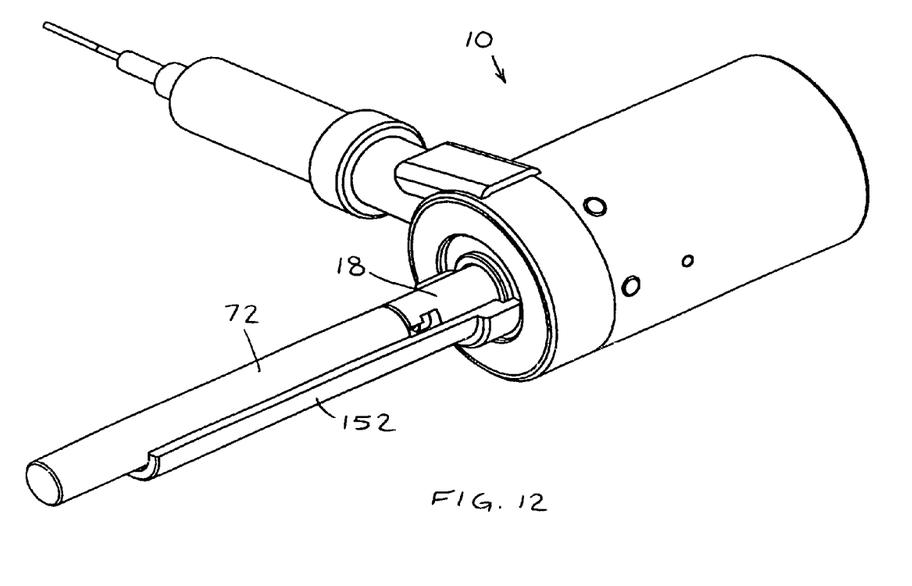
FIG. 12 is a simplified rear perspective illustration of the multifunctional vehicle lock of FIG. 1, with a guide support that supports a locking attachment assembled on a linear extending locking element of the multifunctional vehicle lock.

Reference is now made to FIG. 11, which illustrates a pair of side-extending locking attachments 60 assembled on a pair of second locking elements 20. Guide supports 158, 160 and 162 of different lengths, sizes and shapes may be provided to support locking attachments 60. In addition, a flexible locking attachment 70 may be assembled on first locking element 18. A flexible guide support 150 may be provided to support flexible locking attachment 70. FIG. 12 illustrates a rigid locking attachment 72, which may be assembled on first locking element 18 and supported by a rigid guide support 152. It is appreciated that these are just some examples and the invention is not limited to these examples.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A method for locking a vehicle accessory, comprising:
    providing a cylinder lock comprising a tumbler rotatable about a rotational axis, a coupling member rotationally linked to said tumbler, wherein rotation of said tumbler rotates said coupling member, a first vehicle locking element connected to said coupling member, and a second vehicle locking element connected to said coupling member, wherein rotation of said coupling member moves said first vehicle locking element in a translatory movement along a first axis and simultaneously moves said second vehicle locking element in a translatory movement along a second axis angled at a non-zero angle with respect to said first axis, and wherein at least one of said first and second vehicle locking elements comprises a locking attachment for locking a vehicle accessory; and
    rotating said tumbler about said rotational axis to rotate said coupling member and to move said first and second vehicle locking elements, thereby causing said locking attachment to lock said vehicle accessory,
    wherein said coupling member comprises a worm drive connected to said first vehicle locking element, and wherein said first vehicle locking element is connected to said coupling member by a pin that fits in a helical groove formed in said worm drive, and further comprising rotating said coupling member, wherein as said coupling member rotates, said pin translates along said first axis guided by said helical groove.

2. The method according to claim 1, further comprising geometrically locking at least one of said first and second vehicle locking elements with respect to said coupling member.

3. The method according to claim 1, wherein said helical groove has a terminal arcuate portion, and further comprising geometrically locking said pin in said terminal arcuate portion with respect to said coupling member.

4. The method according to claim 1, wherein said second vehicle locking element is connected to said coupling member by means of a wrist pin and connecting element connection.

* * * * *